United States Patent [19]

Garner

[11] 4,139,353
[45] Feb. 13, 1979

[54] AIR CLEANER

[75] Inventor: Herman H. Garner, Claremont, Calif.

[73] Assignee: Vortox Company, Claremont, Calif.

[21] Appl. No.: 813,190

[22] Filed: Jul. 5, 1977

[51] Int. Cl.² .............................................. B01D 47/02
[52] U.S. Cl. ........................................ 55/253; 55/223;
  55/259; 55/298; 261/DIG. 54
[58] Field of Search .......... 55/223, 239, 241, 249–253,
  55/259, 297, 298, 300, 282; 261/DIG. 54

[56] References Cited

U.S. PATENT DOCUMENTS

| | | | |
|---|---|---|---|
| 2,062,548 | 12/1936 | Wilson | 55/253 |
| 2,171,752 | 9/1939 | Kamrath | 55/249 |
| 2,387,278 | 10/1945 | Lowther | 55/251 |
| 2,397,525 | 4/1946 | Bennett | 55/249 |
| 2,406,278 | 8/1946 | Worth | 55/239 |
| 2,596,121 | 5/1952 | Brixius | 55/251 |
| 2,911,064 | 11/1959 | Evans et al. | 55/300 |
| 2,987,138 | 6/1961 | Walton | 55/253 |

FOREIGN PATENT DOCUMENTS

| | | | |
|---|---|---|---|
| 12528 | 2/1956 | Fed. Rep. of Germany | 55/253 |
| 1141541 | 9/1957 | France | 55/249 |
| 422865 | 1/1934 | United Kingdom | 55/298 |

Primary Examiner—Frank W. Lutter
Assistant Examiner—David L. Lacey
Attorney, Agent, or Firm—Harris, Kern, Wallen & Tinsley

[57] ABSTRACT

An air cleaner of the oil-bath type, in which dust-laden air at high velocity in a stream entering the unit is first mixed with an oil spray and then impinged on an oil washed deflector for directing the mixture outwardly and upwardly through a filter bed to wet the filter bed with oil for catching dust carried by the air, surplus oil being drawn by venturi action from the filter bed and sprayed back into the entry stream for recirculation into the filter bed, and the air cleaner having a dual-chamber oil reservoir and dust collecting means, a novel venturi means, and a mechanical agitator in the air inlet to prevent the accumulation of dust therein.

3 Claims, 4 Drawing Figures

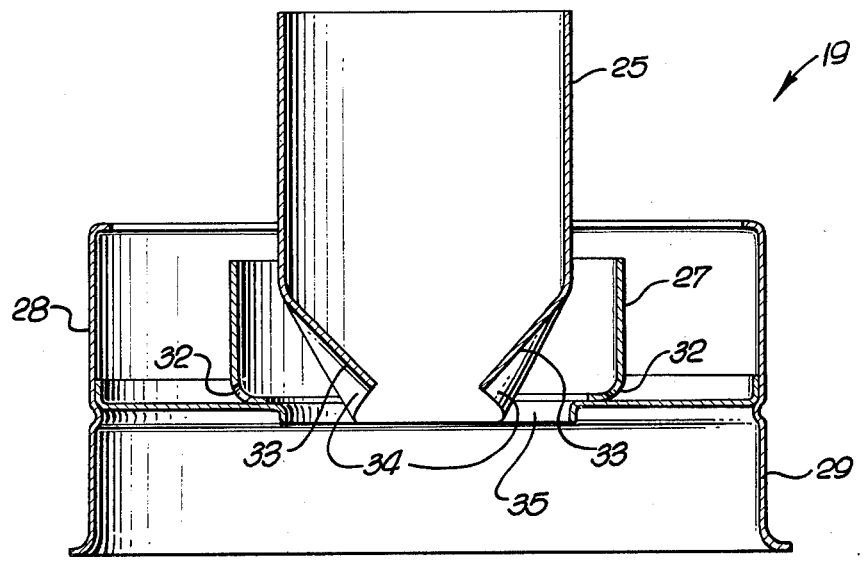
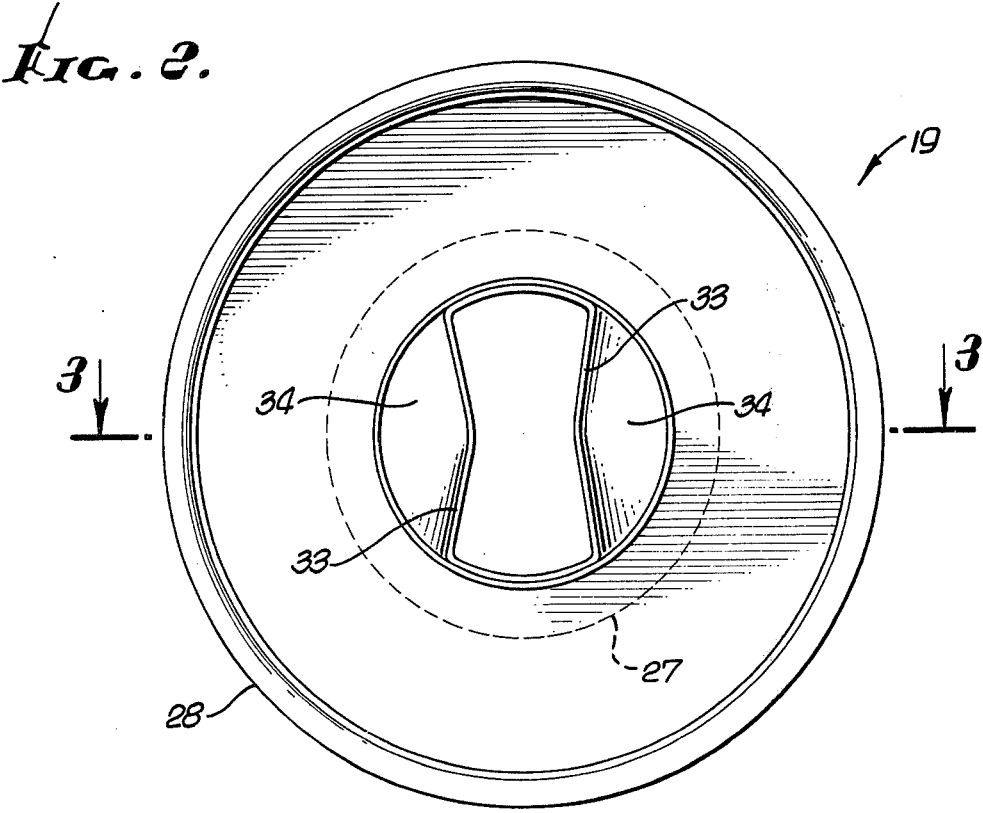

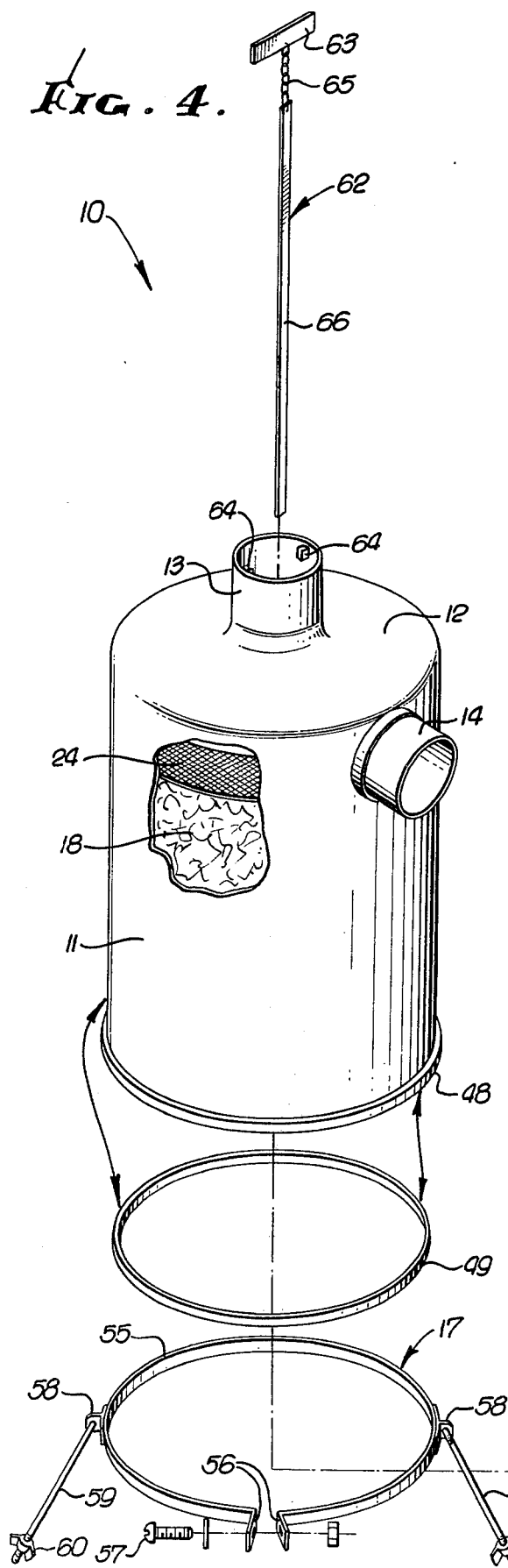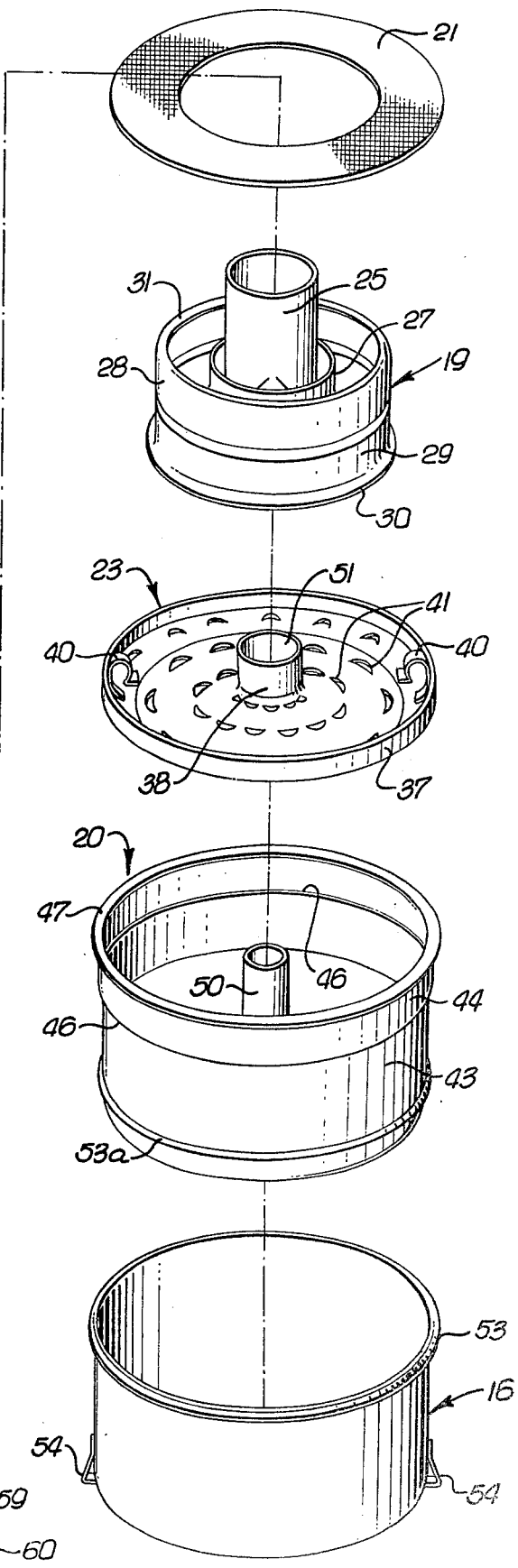
FIG. 4.

AIR CLEANER

BACKGROUND OF THE INVENTION

Air cleaners of the oil-bath type, generally similar to the present invention, are old and well-known in the art. One air cleaner of this general type is shown and described in the patent to Lowther, U.S. Pat. No. 2,387,278, issued Oct. 23, 1945. Such air cleaners are commonly used for removing dust from an air stream supplying the carburetor of an internal combustion engine. They commonly impinge a dust-laden air stream traveling at relatively high velocity against an oil washed deflector to cause the air stream to pick up some oil, deposit some dust in the oil bath, and then travel outwardly and upwardly into a vertical filter bed which is at least partially coated with such oil to catch dust traveling in the air stream, some of the oil in the filter bed settling downwardly by gravity and returning to the oil bath only when the air flow stops or is slowed down sufficiently.

As indicated above, many such air cleaners are provided with a generally horizontal pan or deflector below and in alignment with the air inlet to deflect the air stream issuing from the air inlet outwardly and upwardly through a conventional filter mass in which oil picked up by the air stream is deposited, the deflector limiting the amount of oil carried upwardly into the filter mass. The space below the pan or deflector serves as an oil reservoir and collector for dust removed from the air stream by the cleaner. Such prior reservoirs normally have a relatively small volume so that all of the oil will be absorbed by the dust and other solid foreign material in a relatively short time, the small volume being necessary to prevent any of the oil from passing out the outlet of the cleaner and into the internal combustion engine to which the cleaner is attached, something which must be avoided. Due to the relatively small volume of the reservoir, such prior art cleaners can collect only relatively small amounts of dust and other foreign material and must be taken out of service and cleaned at relatively frequent intervals.

THE INVENTION—GENERALLY

It is a primary object of the present invention to improve the dust-removal efficiency of such conventional air cleaners and to substantially increase their dust-holding capacity.

This is accomplished in part by providing a positive suction from the filter bed of dust-laden oil, spraying it back into the entry air stream flowing at relatively high velocity, by venturi action created by said entry system. It is also accomplished in part by the provision of an improved deflector plate in the oil-bath of the device and against which the entry stream of air and oil spray impinges and is directed outwardly and upwardly to the filter bed, the deflector plate being formed so that the impingement of the air stream thereon will drive dust-laden oil from the top thereof downwardly into the oil bath beneath the plate for the gravity separation of dust therefrom and to draw relatively clean oil upwardly from the oil bath into the air stream for conveyance thereby into the filter bed.

The primary object is accomplished in part by providing in such an air cleaner a dual-chamber oil reservoir below a deflecting plate, in which one chamber collects the major portion of the dust and other foreign material removed from the air stream passing through the cleaner, and the second chamber, connected to the first chamber, acts as a reservoir for oil displaced from the first chamber by the accumulation of dust and other foreign material therein, thereby limiting the amount of oil actively operating through the cleaner and preventing overloading with oil of the filter medium of the cleaner and preventing the discharge of excess oil from the air outlet of the cleaner. In some instances, the excess oil may simply overflow to a suitable disposal point, in which case the second chamber may be omitted.

A further object of the invention is to provide in the air inlet of such an air cleaner a mechanical agitator which will dislodge dust and foreign materials therefrom which would otherwise collect therein and restrict the air flow. Another object is to provide such an agitator which will be operated automatically by the flow of air through the air inlet of the cleaner.

Still another object of the invention is to provide such an air cleaner which is simple to manufacture, assemble, and disassemble.

Other objects and advantages of the invention will appear from the following specification.

THE DRAWINGS

In the drawings, which are for the purpose of illustration only:

FIG. 2 is a bottom plan view of a baffle assembly of the invention;

FIG. 3 is a sectional view taken on the line 3—3 of FIG. 2; and

FIG. 4 is an exploded elevational view of reduced size of the major parts of the upper and lower ends of the cleaner.

DETAILED DESCRIPTION OF THE INVENTION

Figure 1:
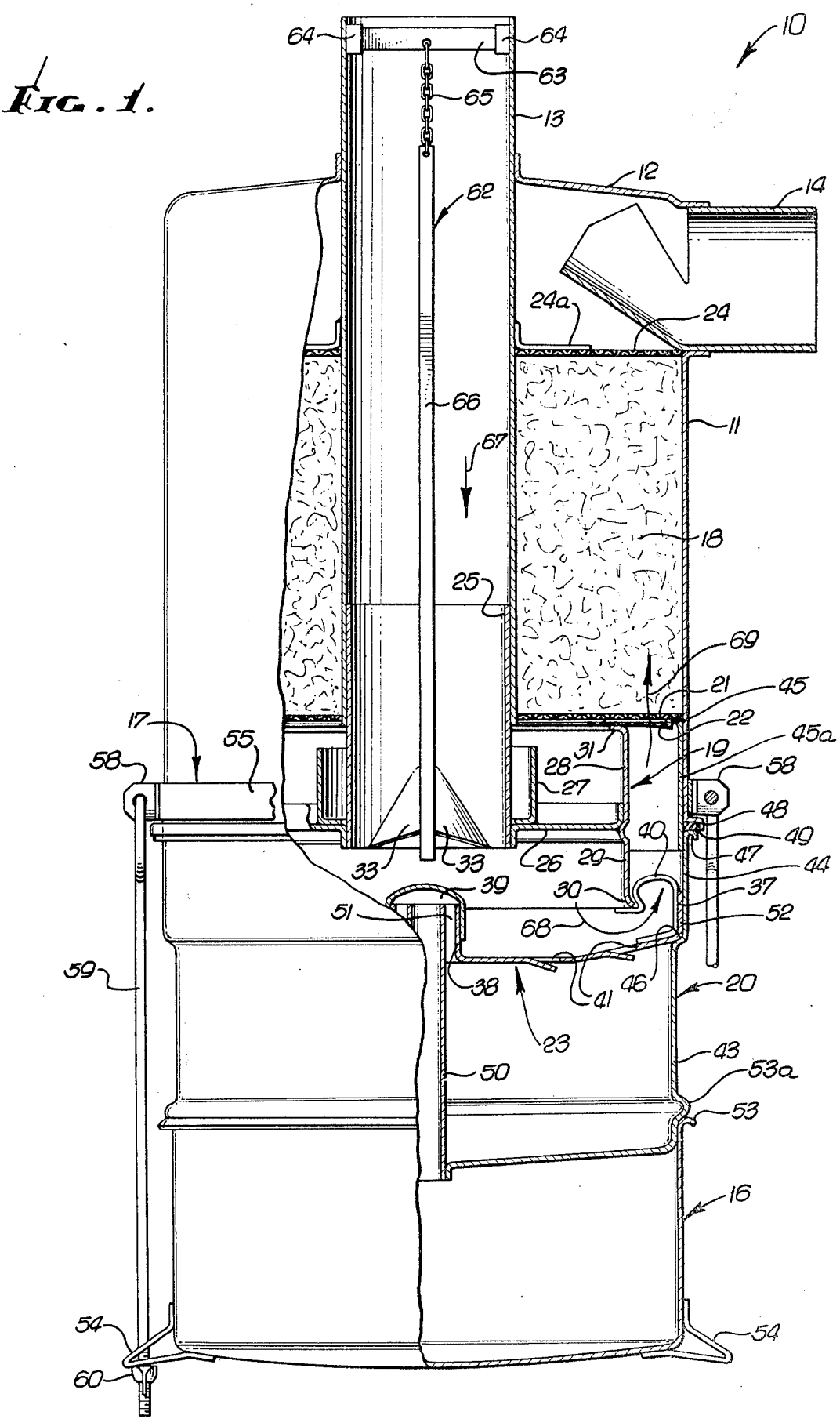
FIG. 1 is a vertical sectional view of the air cleaner of the invention.

Referring to the drawings, FIG. 1 shows an oil-bath air cleaner 10 having an outer upper cylindrical shell 11 provided with an annular top 12 through which extends a cylindrical air inlet tube 13 concentric with the axis of the shell 11, an air outlet tube 14 radially connected to the shell 11, a lower cup 16 seated against an upper cup 20 and detachably connected to the shell 11 by a band assembly 17, an annular filter bed 18 around the inlet tube 13 and in the shell 11, a cylindrical baffle assembly 19, an annular open mesh screen 21 supporting filter bed 18 and an annular secondary chaff catching screen 22, and a deflector plate 23. The screen 21 is supported by a flange 45 welded to and within the shell 11.

The filter bed 18 is confined and held in place in the shell 11 by the open mesh screen 21 at the bottom and an annular screen 24 at the top abutting an annular flange plate 24a secured, as by welding, to the inlet tube 13. The filter bed 18 may be of any suitable material such as a very light weight expanded metal, knitted fine flat wire, or other filter material commonly used in such air cleaners, that can be wound or placed around inlet tube 13 forming a filter medium adapted to collect oil and dust and other foreign material from an air stream passing therethrough. The flange 24a is quite wide to slow down the air passing through the central portion of the filter bed 18 to allow oil to drain down into cup 28.

The removable baffle assembly 19 has a tubular upper portion 25 which makes a close sliding fit in the lower end of the inlet tube 13, has an annular plate 26, an annular outlet tube 27, and an outer cup 28 provided with an annular depending skirt 29 having an outwardly projecting annular bead 30. The parts 25, 26, 27 and 28 of the baffle assembly are welded or otherwise rigidly secured together to form a unit. The outer, oil collecting cup 28 has an annular inwardly turned flange 31 which bears against the bottom of the chaff screen 22 to hold it in place until the baffle assembly is removed.

As best shown in FIGS. 2 and 3, the lower end of the tubular portion 25 is provided with a pair of diametrically spaced inward crimps 33 forming passages 34 which communicate with the open portions 35 of the annular outlet 27 and thence with the interior of the skirt 29. In the outlet 27 are drain holes 32 for draining oil from the cup 28.

Referring to FIGS. 1 and 4, the deflector plate 23 has an upstanding circular outer rim 37 and a circular inner rim 38 over which telescopes a tubular cap 39 which is spotwelded or otherwise secured to the inner rim 38. Rigidly secured to the deflector plate 23 is a pair of diametrically spaced spring members 40, which, as shown in FIG. 1, snap onto the annular bead 30 of the skirt 29. The deflector plate 23 is provided with rows of semicircular cuts 41 with the inside bent downwardly as shown in FIG. 1.

The upper cup 20 has a lower portion 43 and an upper portion 44. The upper end of the latter telescopes over a depending tubular portion 45a of an annular flange 45. The upper portion 44 is of greater diameter than the lower portion 43 to form an annular ledge 46 therebetween. The upper end of the upper portion 44 is provided with an outwardly projecting flange 47 which cooperates with a similar flange 48 on the lower end of the outer shell 11 to clamp an annular gasket 49 therebetween, which gasket surrounds the tubular portion 45a. The upper cup 20 near its center has an upwardly projecting overflow tube 50 which extends into the inner rim 38 of the deflector plate 23 to provide an annular passage 51 therebetween. The deflector plate 23 at its periphery seats on the annular ledge 46 of the upper cup 20.

An annular bead 53a on the upper cup 20 seats on an annular flange 53 on the upper rim of the lower cup 16. The lower end of the lower cup 16 is provided with a pair of diametrically spaced brackets 54 adapted to cooperate with the band assembly 17.

The band assembly 17 includes a circular metal band 55 on the ends of which are a pair of perforated lugs 56, the band assembly being adapted to rest on the flange 48 and be held to the outer shell 11 by a conventional screw and nut combination 57, FIG. 4, cooperating with the lugs 56. The band 55 is also provided with a second pair of perforated lugs 58 through which pass a pair of rods 59 (only one thereof being shown in FIG. 1) the lower ends of which are adapted to pass through suitable openings in the brackets 54 and be clamped thereto by thumb nuts 60 threaded thereon.

By tightening the thumb nuts 60, the lower cup 16 and the upper cup 20 are pulled upwardly to clamp the gasket 49 between the flanges 47 and 48 to form a fluid tight seal between the upper outer shell 11 and the lower end of the air cleaner 10. By loosening the thumb nuts 60 and moving the rods 59 outwardly out of the brackets 54 the lower cup 16, upper cup 20, deflector plate 23, baffle assembly 19, and chaff screen 22 may be removed readily from the outer shell 11, for emptying dirt and replacement of oil.

The filter bed 18 may be formed by any suitable material such as very light coil springs or knitted flat wire wound around inlet tube 13 and permeable to air flow therethrough, but adapted to catch oil and dust and other foreign material carried by an air stream passing therethrough. It is supported on the screen 21. The chaff screen 22 is easily removed along with the baffle assembly 19, which holds it in place, and may be built up of several layers of material, such as two moderately heavy expanded metal pieces to give it strength and rigidity with three or four layers of very lightweight expanded metal sandwiched between to provide the necessary fine mesh to catch chaff and other large particles impinged thereon by an air stream.

The air cleaner 10 is provided with a mechanical agitator 62 comprising a straight bar 63 which fits into two diametrically spaced U-spaped lugs 64 in the upper end of the inlet tube 13, the bar having connected thereto a short section of chain 65 which acts as a swivel and from which depends a strip 66 formed of relatively flexible material, such as Nylon, or a similar relatively flexible material. When assembled, as shown in FIG. 1, the strip 66 of the agitator 62 hangs down through the air inlet tube 13, preferably to a point slightly below the lower end of the tubular upper portion 25 of the baffle assembly 19, for a purpose described hereinafter.

In preparation for service operation of the air cleaner 10, the cups 20 and 16 and deflector plate 23 are detached from the upper outer shell 11, as described above, and the upper cup 20 and the deflector plate 23 are filled with a suitable oil, e.g., 10-20 SAE, up to the top of the overflow tube 50, which forms an oil bath in the upper cup and deflector plate.

In operation, the outlet tube 14 is normally connected to the intake of the carburetor (not shown) of an internal combustion engine, which, in operation, will impose a suction in the outlet tube. This, in turn, will draw air into the air inlet tube 13, downwardly threthrough and through the upper portion 25 of the baffle assembly 19, through the baffle assembly 19, upwardly around the baffle assembly through the chaff screen 22, upwardly through the filter bed 18, through the annular screen 24, into the open upper end of the shell 11 and out of it through the outlet tube 14. The rate of such air flow through the air cleaner 10 of course depends upon the speed at which the internal combustion engine to which the air cleaner is connected and the dimensions of the parts of the air cleaner, and such air flow may vary widely from only a few c.f.m. to over 1000 c.f.m. Such air flow entering the air cleaner 10 through the inlet tube 13 commonly contains dust and other foreign materials from the ambient atmosphere, in widely varying quantities dependent upon ambient conditions.

Considering the operation of the air cleaner 10 in more detail, dust-laden air enters the inlet tube 13 and passed downwardly therethrough in the direction of the arrow 67 at relatively high velocity and is discharged at increased velocity past the crimps 33 and lower ends of the passages 34 and the open portions 35. This creates a venturi effect at the bottom of the inlet tube 13 and a suction tending to draw liquid from the outlet tube 27 back into the air stream in the inlet tube. Such air stream impinges on the oil flooded surface of the deflector plate 23, sweeping all surplus oil from above the plate with it as it passes outwardly, again at high velocity, in the direction of arrow 68, under the lower outer edge of baffle assembly 19 and then passing upwardly, in the direction of arrow 69, carrying droplets of oil with it, through the removable chaff screen 22, through the filter bed 18, where it leaves the oil and then outwardly through the outlet tube 14 to the engine to which the air cleaner is suitably connected.

The cup 28 of the baffle assembly 19 directs the major portion of the air stream flowing upwardly therearound through the outer annular portion of the filter medium 18 and acts as a baffle to form a relatively quiet annular zone immediately around the inlet tube 13 and above the cup 28. Excess oil in the air stream collects in such quiet zone and flows downwardly to collect in the cup 28, such downward flow being caused by gravity and the suction created by the hereinbefore-discussed venturi effect. From the cup 28, the excess oil, and foreign solid material carried thereby, overflows into the outlet tube 27 and back into the air stream emerging from the lower end of the tubular upper portion 25 of the baffle assembly, as will be clear from FIG. 3.

Considering the foregoing in more detail, the purpose of the cup 28 is to hold some of the oil picked up from above the deflector 23, preventing this oil from overflowing the filter. The reason this oil is necessary above the deflector plate 23 is that it provides a point of high velocity air flow and oil action at idling speed of the engine when the total volume of air is very low. As will be seen from the drawing, the overflow oil level is at the top of the overflow tube 50 and the annular bead 30 at the bottom edge of the skirt 29 just dips into this oil when no air is flowing through the air cleaner. Then, at idling speed and very low air flow, some of this oil is spattered on the upper portion 44 of the cup 20, leaving a narrow slit to give the air high velocity to impinge any dust particles on the oily surface of 44.

When the throttle is opened and the air velocity increases, all oil above the deflector plate 23 is swept up into the filter 18 and dropped into the cup 28, some overflowing through 27, and being sprayed down on the surface of 23 to keep it wet to catch the dust particles impinged thereon.

The drain holes 32 are for the purpose of draining all of the oil out of the cup 28 when the air flow is stopped, or slowed down sufficiently, so that this oil may accumulate above the deflector 23 to provide efficiency at low air flows. However the holes are not large enough to drain all the recirculating oil at full engine speed, when it overflows through 27 as already explained.

The air stream emerging from the lower end of the tubular upper portion 25 of the baffle assembly 19 strikes the tubular cap 39 and deflector plate 23 and is deflected outwardly across the deflector plate, sweeping most of the oil therefrom and carrying it upwardly into the filter medium 18. Some of such oil is driven by the air stream through the inner series of cuts 41 into the upper cup 20 and carries with it solid foreign material therein most of which settles by gravity to the bottom of the upper cup, and forcing relatively clean oil from the top of the upper cup upwardly through the outer series of cuts 41 back into the air stream passing thereacross.

The air cleaner 10 is designed so that when it is first put in operation, for a maximum volume of flow of air through the air inlet tube 13 substantially all of the oil picked up thereby from the deflector plate 23 will be deposited in the filter medium 18 and circulated by the air stream as described. None of this oil is carried out of the air cleaner through the outlet tube 14 to the carburetor inlet of the internal combustion engine to which the air cleaner is attached, which is an important object of the invention as the carrying of oil and foreign material into such carburetor inlet cannot be tolerated.

During the operation of the air cleaner, solid foreign material deposits in the upper cup 20 and accumulates in the bottom thereof, reducing the volume in the upper cup available for the storage of oil. As the volume of such foreign material in the bottom of the upper cup 20 increases, oil is forced upwardly from the oil reservoir below the deflector plate 23 into the annular passage 51 and thence into the overflow tube 50, and then flows downwardly therethrough into the lower cup 16, where it collects. From this point forward in the operation of the air cleaner 10, the volume of oil carried by the air stream passing therethrough and circulated as described remains substantially uniform and below the point at which excess oil would be carried by the air stream out of the outlet tube 14 as suggested above.

What determines the maximum length of time before servicing is the amount of dirt in the oil in the cup 20. The air cleaner 10 should be serviced before the oil in the cup 20 has absorbed so much dust that the oil can no longer flow. Otherwise, dirt piles up on the deflector plate 23, screen 22, etc., causing restriction to air flow. Preferably, the air cleaner is emptied before that occurs. More particularly, it is necessary to take the air cleaner 10 out of service, dismantle it, clean the upper and lower cups 20 and 16 of accumulated foreign material, empty the accumulated oil from the lower cup, and replenish the upper cup with clean oil, and then reassemble the air cleaner and put it back into service.

The effective life of my air cleaner, before cleaning is required, is greatly extended, over that of generally similar prior art air cleaners, by the maintenance in my cleaner of a substantially uniform quantity of reservoir oil being circulated in and through the cleaner during its useful period of operation, such oil being transferred from the upper cup 20 to the lower cup 16 as dust accumulates in the upper cup. Further, with this overflow from the upper cup 20, there is no way oil can enter the engine, even if the air cleaner becomes clogged with dirt.

Tests have established that with conventional prior art air cleaners of, for example, 12 inches in diameter, only five to six pounds of foreign materials can be accumulated in the oil reservoirs thereof before they must be taken out of service and cleaned, whereas, utilizing my air cleaner of comparable size, about twenty to thirty pounds of such foreign material can be accumulated before cleaning is required, which is a vast improvement, and that my air cleaner has an effective service life over double that of such prior art air cleaners.

I claim:

1. In an air cleaner, the combination of:
   (a) a shell providing a filter chamber;
   (b) a liquid reservoir cup below and connected to said shell with an open space below said filter chamber;
   (c) an air permeable filter medium in said filter chamber;
   (d) air inlet means connected to said shell and opening into said open space;
   (e) deflector means located in said reservoir cup for directing an air stream issuing from said air inlet means upwardly through said open space and into said filter medium, whereby the air stream will carry liquid when contained in said reservoir from said reservoir upwardly into said filter medium;
   (f) an air outlet connected to said shell and communicating with said filter chamber;

(g) overflow means communicating with said reservoir cup, whereby liquid drains from said reservoir cup when liquid is contained in said cup and rises above said overflow means;

(h) said overflow means including a lower cup below and connected to said reservoir cup; and (i) said overflow means including means interconnecting said cups in communication adjacent their centers.

2. An air cleaner as defined in claim 1, in which said interconnecting means includes an upstanding tube connected to said reservoir cup and having an open upper end communicating with said reservoir cup and an open lower end communicating with said lower cup.

3. In an air cleaner, the combination of:

(a) a shell providing a filter chamber;

(b) a liquid reservoir cup below and connected to said shell with an open space below said filter chamber;

(c) an air permeable filter medium in said filter chamber;

(d) air inlet means connected to said shell and opening into said open space;

(e) deflector means in said reservoir cup for directing an air stream issuing from said air inlet means upwardly through said open space and into said filter medium, whereby the air stream will carry liquid when contained in said reservoir from said reservoir upwardly into said filter medium;

(f) an air outlet connected to said shell and communicating with said filter chamber;

(g) a second cup in said open space above said deflector means and below said filter chamber and surrounding said air inlet means, whereby when liquid drains from said filter medium is collected in said second cup; and (h) return means interconnecting said second cup and said reservoir cup above said deflector means, said return means including a relatively large overflow passage and drain openings providing a relatively small drain passage, whereby when liquid is contained in said second cup is returned to said reservoir cup above said deflector means.

* * * * *